US 8,972,476 B2
Mar. 3, 2015

(12) United States Patent
Titus

(54) EVIDENCE-BASED VIRTUAL WORLD VISUALIZATION

(75) Inventor: Tobin Titus, East Liverpool, OH (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 946 days.

(21) Appl. No.: 12/489,442

(22) Filed: Jun. 23, 2009

(65) Prior Publication Data

US 2010/0325189 A1    Dec. 23, 2010

(51) Int. Cl.
    *G06F 15/16* (2006.01)
    *A63F 13/30* (2014.01)
    *G06Q 10/10* (2012.01)

(52) U.S. Cl.
    CPC ............... *A63F 13/12* (2013.01); *G06Q 10/10* (2013.01); *A63F 2300/513* (2013.01); *A63F 2300/535* (2013.01); *A63F 2300/5586* (2013.01)
    USPC ............................ 709/201; 715/757; 463/40

(58) Field of Classification Search
    USPC ............................ 709/201; 715/757; 463/40
    See application file for complete search history.

(56) References Cited

U.S. PATENT DOCUMENTS

| | | | |
|---|---|---|---|
| 5,471,541 A | 11/1995 | Burtnyk et al. | |
| 6,069,632 A | 5/2000 | Mullaly et al. | |
| 6,584,403 B2 | 6/2003 | Bunn | |
| 6,650,779 B2 | 11/2003 | Vachtesvanos et al. | |
| 7,106,202 B2 | 9/2006 | Dickinson | |
| 7,299,125 B2 | 11/2007 | Marks et al. | |
| 7,373,377 B2 | 5/2008 | Altieri et al. | |
| 7,667,604 B2 | 2/2010 | Ebert et al. | |
| 7,870,999 B2 | 1/2011 | Skaaksrud et al. | |
| 7,890,638 B2 | 2/2011 | Benco et al. | |
| 2002/0052688 A1 | 5/2002 | Yofu | |
| 2003/0177187 A1 | 9/2003 | Levine et al. | |
| 2003/0216962 A1* | 11/2003 | Heller et al. | 705/14 |
| 2005/0251494 A1 | 11/2005 | Maria Jansen | |
| 2006/0018519 A1 | 1/2006 | Siegel et al. | |
| 2006/0098842 A1 | 5/2006 | Levine | |
| 2006/0136237 A1 | 6/2006 | Spiegel et al. | |
| 2006/0138223 A1 | 6/2006 | Schar | |
| 2006/0282277 A1 | 12/2006 | Ng | |
| 2007/0130001 A1 | 6/2007 | Jung et al. | |
| 2007/0198939 A1 | 8/2007 | Gold | |
| 2007/0268299 A1 | 11/2007 | Jung et al. | |

(Continued)

FOREIGN PATENT DOCUMENTS

EP    1 047 017    10/2000

OTHER PUBLICATIONS

U.S. Official Action dated Nov. 10, 2011 in U.S. Appl. No. 12/469,685.

(Continued)

*Primary Examiner* — Thomas Dailey
(74) *Attorney, Agent, or Firm* — Dan Choi; Judy Yee; Micky Minhas

(57) ABSTRACT

When evidence is received, a determination is made as to whether the evidence is sufficient to determine whether to block transmission of virtual world data to a client device. If it is determined that the evidence is sufficient, then another determination is made as to whether to block transmission of virtual world data to the client device based on the evidence. If it is determined to block transmission of virtual world data to the client, a data protection and abstraction module is transformed to a first state that blocks transmission of the virtual world data to the client device.

18 Claims, 4 Drawing Sheets

(56) References Cited

U.S. PATENT DOCUMENTS

| | | | |
|---|---|---|---|
| 2008/0026838 | A1 | 1/2008 | Dunstan et al. |
| 2008/0052881 | A1 | 3/2008 | Oertel |
| 2008/0186307 | A1 | 8/2008 | Leifenberg |
| 2008/0210750 | A1 | 9/2008 | Skaaksrud et al. |
| 2008/0262646 | A1 | 10/2008 | Breed |
| 2008/0263446 | A1 | 10/2008 | Altberg et al. |
| 2008/0263458 | A1 | 10/2008 | Altberg et al. |
| 2008/0263459 | A1 | 10/2008 | Altberg et al. |
| 2008/0263460 | A1 | 10/2008 | Altberg et al. |
| 2009/0008450 | A1 | 1/2009 | Ebert et al. |
| 2009/0018712 | A1 | 1/2009 | Duncan et al. |
| 2009/0087029 | A1 | 4/2009 | Coleman et al. |
| 2009/0100352 | A1 | 4/2009 | Huang et al. |
| 2009/0106672 | A1 | 4/2009 | Burstrom |
| 2009/0111583 | A1* | 4/2009 | Zalewski et al. ............. 463/42 |
| 2009/0112970 | A1 | 4/2009 | Dawson |
| 2009/0113319 | A1 | 4/2009 | Dawson et al. |
| 2009/0150802 | A1 | 6/2009 | Do et al. |
| 2009/0158220 | A1 | 6/2009 | Zalewski et al. |
| 2009/0222424 | A1 | 9/2009 | Van |
| 2009/0326971 | A1 | 12/2009 | Piccinini et al. |
| 2010/0013828 | A1 | 1/2010 | Castelli et al. |
| 2010/0081508 | A1* | 4/2010 | Bhogal et al. ............. 463/40 |
| 2010/0257071 | A1 | 10/2010 | Bokor et al. |
| 2010/0295847 | A1 | 11/2010 | Titus |
| 2010/0299640 | A1 | 11/2010 | Titus et al. |

OTHER PUBLICATIONS

Brick HouseSecurity.com, "World's Smallest Global Positioning 16 Satellite Real Time Tracking System", Downloaded Feb. 9, 2009 from http://www.brickhousesecurity.com/worldtrack-small-covert-gps-tracking.html, 3 pages.

ReDeTrack.com homepage, Downloaded Feb. 9, 2009 from http://www.redetrack.com/, 1 page.

Magneto Technologies, "Internet Based Parcel Tracking System", Downloaded Feb. 9, 2009 from http://magnetoweb.com/Bespoke_Software/Mobile_Software/Internet_Based_ParceLTracking_System/, 1 page.

GPSNorthAmerica.com homepage, downloaded Feb. 9, 2009 from http://www.gpsnorthamerica.com, 1 page.

GPS-CellPhones.com, "G-Trac Phone and Tracker Tracking Specifications", downloaded Feb. 9, 2009 from http://www.gps-cellphones.com/gps-tracking-solutions/gps-cellphone-specs.htm1,2 pages.

"TrackMe", downloaded Feb. 9, 2009 from http://www.luisespinosa.com/trackme_eng.html, 7 pages.

Johnson, Joel Ivory, "GPS Tracking with Windows Mobile 5.0+", Aug. 15, 2007, downloaded from http://www.codeproject.com/KB/mobile/FindMe.aspx, 4 pages.

Li, et al., "Participatory Comprehensive Plan based on Virtual Geographical Environment", Downloaded Feb. 16, 2009 from http://www.aars-acrs.org/acrs/proceeding/ACRS2002/Papers/GIS02-12.pdf, 8 pages.

Maher, et al., "Agent Models for Dynamic 3D Virtual Worlds," 2005, Proceedings of the 2005 International Conference on Cyberworlds (CW 05).

Nebiker et al., "Smart Point Clouds in Virtual Globes—A new paradigm in city modeling?" downloaded Jul. 22, 2009 from http://geovisualisierung.net/geoviz_hamburg/papers/09_2_Nebiker.pdf, 2 pages.

Pettifer, et al., "A Collaborative Access Model for Shared Virtual Environments", Jun. 20-22, 2001, Proceedings of the 10th IEEE International Workshop on Enabling Technologies: Infrastructure for Collaborative Enterprises, p. 257-262, 6 pages.

Petrov et al., "Optical 3D Digitizers: Bringing Life to the virtual World," May/Jun. 1998, *Computer Graphics I/O Devices*. 10 pages.

Strauchmann et al., "Coaction of Semantic Technology and Virtual Reality in an Integrated Engineering Environment", Downloaded Feb. 16, 2009, from http://www-sop.inria.fr/acacia/WORKSHOPS/KW4ED-KCAP2007/associated_files/Coaction_VR_and_Semantic.pdf, 18 pages.

van Maren, et al., "Karma VI: A Virtual Reality Interface for the Spatial Database Engine", Jul. 26-30, 1999, Proceedings of the 1999 ESRI International User Conference, Downloaded from http://gis.esri.com/library/userconf/proc99/proceed/papers/pap551/p551.htm, 12 pages.

Ying, et al., "Petri Net Model for Subjective Views in Collaborative Virtual Environments", 2004, Proceedings of the 4th International Symposium on Smart Graphics, pp. 128-134., pp. 7.

Ying, et al."Petri Net Model for Subjective Views in Collaborative Virtual Environments", Retrieved at<<http://w5.cs.uni-sb.de/~butz/events/sg04/CRV/30310132.pdf>>, pp. 7.

Hoyer, et al."A Multiuser Virtual-Reality Environment for a Tele-Operated Laboratory", Retrieved at<<http://ieeexplore.ieee.org/ielx5/13/28334/01266759.pdf?arnumber=1266759&htry=1>>, IEEE Transactions on Education, vol. 47, No. 1, Feb. 2004, pp. 121-126.

Pettifer, et al."A Collaborative Access Model for Shared Virtual Environments", Retrieved at<<http://aig.cs.man.ac.uk/publications/papers/KMN2001.pdf>>, pp. 6.

Maren, et al."Karma VI: A Virtual Reality Interface for the Spatial Database Engine", Retrieved at<<http://gis.esri.com/library/userconf/proc99/proceed/papers/pap551/p551.htm>>, pp. 12.

Jamin, et al."Coaction of Semantic Technology and Virtual Reality in an Integrated Engineering Environment", Retrieved at<<http://www-sop.inria.fr/acacia/WORKSHOPS/KW4ED-KCAP2007/associated_files/Coaction_VR_and_Semantic.pdf>>, pp. 18.

Li, et al."Participatory Comprehensive Plan based on Virtual Geographical Environment", Retrieved at<<http://www.aars-acrs.org/acrs/proceeding/ACRS2002/Papers/GIS02-12.pdf>>, pp. 1-8.

U.S. Official Action dated May 12, 2011 in U.S. Appl. No. 12/469,685.

U.S. Official Action dated Mar. 5, 2012 in U.S. Appl. No. 12/469,686.

U.S. Notice of Allowance dated Jul. 9, 2012 in U.S. Appl. No. 12/469,685.

U.S. Official Action dated Sep. 21, 2012 in U.S. Appl. No. 12/469,686.

U.S. Official Action dated Sep. 23, 2013 in U.S. Appl. No. 12/469,686.

U.S. Official Action dated Feb. 10, 2014 in U.S. Appl. No. 12/469,686.

* cited by examiner

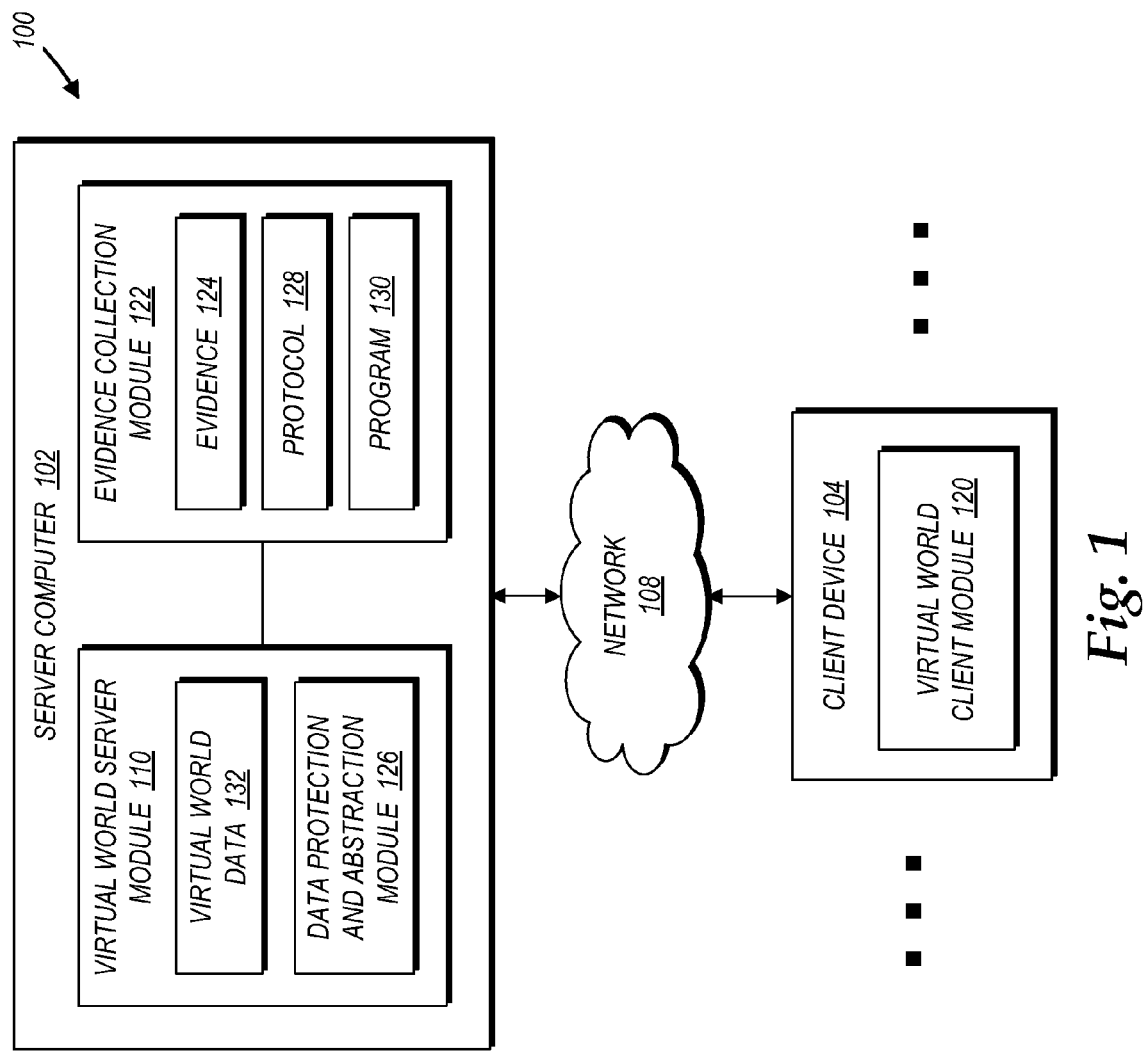

EVIDENCE-BASED VIRTUAL WORLD VISUALIZATION

BACKGROUND

In recent years, massively multiplayer online ("MMO") computer applications, such as massively multiplayer online role-playing games ("MMORPGs"), have become extremely popular not only with serious gamers, but also with casual gamers and other Internet users. One example of a MMO computer application enables a participant to create and develop a fictional character in a virtual world. The fictional character is usually associated with an avatar or some other visual representation that enables other participants to recognize the particular fictional character. A given participant may develop, among other things, a storyline, a reputation, and attributes of her fictional character by interacting in the virtual world via the fictional character. Other examples of MMO computer applications may not involve the creation of a virtual world representation of the participant.

The virtual world typically includes an environment with a variety of virtual locations containing a variety of virtual objects. In some cases, the virtual locations and the virtual objects mimic realistic locations and objects, while in other cases, the virtual locations and virtual objects are fanciful creations. MMO computer applications generally permit the fictional character to travel across the virtual locations and interact with the virtual objects and other fictional characters.

Virtual worlds are typically configured to provide a single view of the virtual world for multiple users. For example, a given virtual room may include a poster that is attached to a wall. As users direct their avatars into the virtual room, the users may view a rendering of the virtual room and virtual objects, such as the poster, contained in the virtual room. This rendering may be the same for each of the users. However, if the poster contains a controversial picture or message, the owner of the virtual room may prefer that only select users can view the poster. Conventional implementations of virtual world rendering programs are capable of providing only a single view of the virtual room, i.e., a view that includes a single representation of the poster.

It is with respect to these and other considerations that the disclosure made herein is presented.

SUMMARY

Technologies are described herein for providing evidence-based virtual world visualization. In particular, an evidence collection module and a data protection and abstraction module may be provided. The evidence collection module is operative to collect evidence, which is provided to the data protection and abstraction module. The evidence may include information about the virtual world and information about the real world. Examples of evidence about the virtual world may include information about an avatar and information about the virtual world environment surrounding an avatar. Examples of evidence about the real world may include information about a user, information about the computers utilized by the user, network systems, geographical location, and the like.

The evidence collection module may collect evidence through a push-based process and/or through a query-based process. In a push-based process, an evidence provider selects evidence and provides the evidence to the evidence collection module in an automated manner without a query from the evidence collection module. In particular, the evidence provider may select the evidence and provide the evidence to the evidence collection module according to a protocol or a program. In a query-based process, an evidence provider selects evidence and provides the evidence to the evidence collection module in response to a query from the evidence collection module.

The data protection and abstraction module is operative to permit or block the transmission of virtual world data to a client device. The data protection and abstraction module may determine whether to permit or block the transmission of virtual world data to the client device based on the evidence collected by the evidence collection module. The virtual world data may include data enabling the client device to render a portion of the virtual world. For example, the virtual world data may include data enabling the client device to render a virtual room and virtual objects within the virtual room. In this example, the data protection and abstraction module may permit or block the transmission of virtual world data associated with a particular virtual object. If the data protection and abstraction module permits the transmission of the virtual world data associated with the virtual object, then the client device may render the virtual room including the virtual object. However, if the data protection and abstraction module blocks the transmission of the virtual world data associated with the virtual object, then the client device may render the virtual room without the virtual object.

According to one embodiment, a method is provided herein for providing evidence-based virtual world visualization. When evidence is received, a determination is made as to whether the evidence is sufficient to determine whether to block transmission of virtual world data to a client device. If it is determined that the evidence is sufficient, then another determination is made as to whether to block transmission of virtual world data to the client device based on the evidence. If it is determined to block transmission of virtual world data to the client, a data protection and abstraction module is transformed to a first state that blocks transmission of the virtual world data to the client device.

It should be appreciated that although the features presented herein are described in the context of a MMO computer application, these features may be utilized with any type of virtual world or environment including, but not limited to, other types of games as well as online social communities. It should also be appreciated that the above-described subject matter may also be implemented as a computer-controlled apparatus, a computer process, a computing system, or as an article of manufacture such as a computer-storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all of the disadvantages noted in any part of this disclosure.

BRIEF DESCRIPTION OF THE DRAWINGS

FIG. 1 is a network architecture diagram showing aspects of a network architecture capable of implementing a virtual world, in accordance with embodiments;

DETAILED DESCRIPTION

Figure 2B:
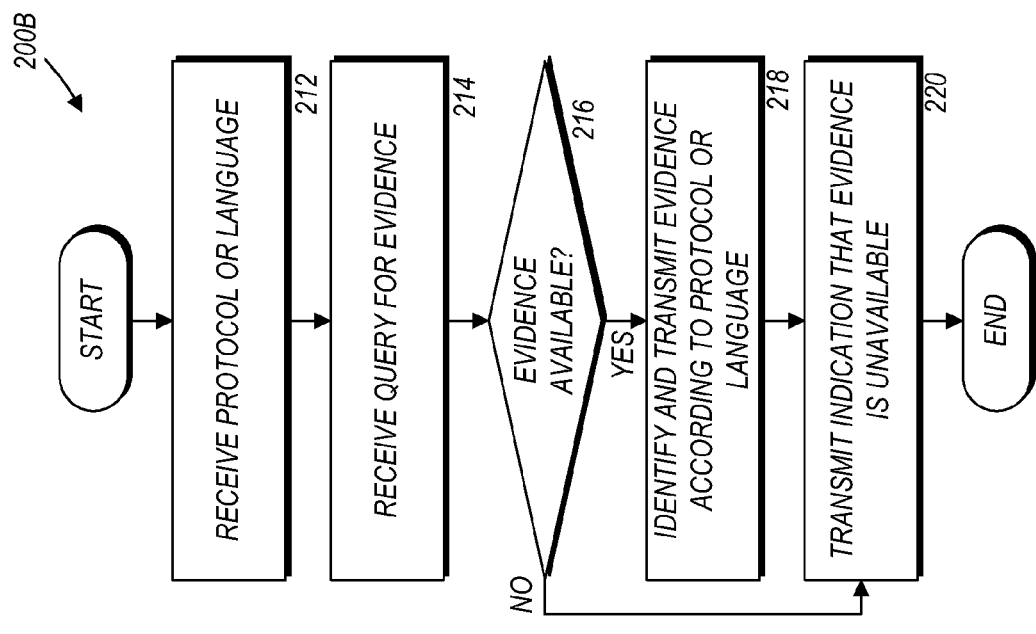
FIG. 2B is a flow diagram illustrating a method for collecting evidence through a query-based process, in accordance with embodiments.

The following detailed description is directed to technologies for providing evidence-based virtual world visualization. Through the utilization of the technologies and concepts presented herein, a variety of evidence is collected through an evidence collection module and provided to a data protection and abstraction module. The data protection and abstraction module may permit or block the transmission of virtual world data to a client device based on the collected evidence. Depending on the virtual world data that is permitted or blocked by the data protection and abstraction module, the client device may render a different view of the virtual world.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

As used herein, the term virtual world refers to a computer-implemented environment, which may include simulated, lifelike environments as well as fanciful, non-existing environments. Examples of virtual worlds may include any massively multiplayer online ("MMO") computer application including, but not limited to, massively multiplayer online role-playing games ("MMORPGs"), virtual social communities, and virtual reality computer applications. In one embodiment, the MMO computer application simulates a real world environment. For example, the virtual world may be defined by a number of rules, such as the presence of gravity or the lack thereof. In other embodiments, the MMO computer application includes a fanciful environment that does not simulate a real world environment.

The virtual world may be inhabited by avatars, which are virtual or symbolic representations of real world participants (hereinafter referred to as participants). As such, each avatar is typically associated with and controlled by a particular participant. Avatars may include two-dimensional and/or three-dimensional images. Through the virtual world, the avatars may interact with other avatars, as well as with virtual objects. Virtual objects may include virtual representations of real world objects, such as houses, cars, billboards, clothes, packages, and soda cans, as well as fanciful creations, such as a teleportation machine or a flying car. The avatars and the virtual objects utilized in the virtual world may or may not be animated images.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for implementing a virtual world will be described. In particular, FIG. 1 illustrates a simplified network architecture 100 for implementing a virtual world. The network architecture 100 shown in FIG. 1 includes a server computer 102 and a client device 104, each of which is operatively coupled via a network 108. The network 108 may be any suitable network, such as a local area network ("LAN") or the Internet. Although only one client device 104 is illustrated in FIG. 1, the network architecture 100 may include multiple client devices and multiple computing devices in any suitable network configuration.

The client device 104 may be any suitable processor-based device, such as a computer, a mobile device, or a gaming device. Exemplary gaming devices include the XBOX and the XBOX 360 from MICROSOFT CORPORATION, the WII from NINTENDO COMPANY, LIMITED, and the PLAYSTATION 3 and the PSP from SONY CORPORATION. Although not so illustrated in FIG. 1, the client device 104 may be coupled to any suitable peripheral devices to enable the participant to experience and interact with the virtual world. Example peripheral devices may include an input device, such as a keyboard, a mouse, a microphone, and a game controller, and an output device, such as a display and speakers. Some peripheral devices may even provide both input and output functionality. For example, a game controller may provide vibration feedback.

As shown in FIG. 1, the client device 104 includes a virtual world client module 120, which interacts with a virtual world server module 110 executing on the server computer 102. In particular, the virtual world client module 120 may receive and process data from the virtual world server module 110 and output the data to output devices coupled to the client device 104. Further, the virtual world client module 120 may receive data from input devices coupled to the client device 104 and transmit the data to the virtual world server module 110.

The virtual world client module 120 may include any suitable component for accessing the virtual world server module 110. In one example, the virtual world client module 120 may be a computer application configured to locally provide at least a portion of the virtual world for the client device 104. In this way, the amount of data retrieved from the server computer 102 by the client device 104 to generate the virtual world may be reduced. In another example, the virtual world client module 120 may be a web browser configured to retrieve the virtual world from the virtual world server module 110. Since many public computers, such as those found in Internet cafes, commonly have a web browser installed and prohibit the installation of new computer applications, providing participants a way to access the virtual world via the web browser may provide greater accessibility and convenience.

As shown in FIG. 1, the server computer 102 includes an evidence collection module 122 and a data protection and abstraction module 126. The virtual world server module 110 generally administers the virtual world and serves as a conduit between multiple client devices, including the client device 104. The evidence collection module 122 generally collects evidence 124 regarding participants, the virtual world, and/or computing resources providing the virtual world. As described in greater detail below, the evidence collection module 112 may collect the evidence 124 via a push-based process and/or a query-based process. The data protection and abstraction module 126 generally permits or restricts the transmission of virtual world data 132 from the virtual world server module 110 to the virtual world client module 120 based on the collected evidence 124.

When a participant desires to access the virtual world, the participant may initiate the virtual world client module 120 to establish a session with the virtual world server module 110 via the network 108. During the session, the virtual world server module 110 may transmit virtual world data 132 (e.g., environment layouts, avatar movements of other participants, virtual objects) associated with the virtual world to the virtual world client module 120. Similarly, the virtual world client module 120 may transmit data from associated input devices to the virtual world server module 110.

According to embodiments, the evidence collection module 122 is operative to collect the evidence 124. The evidence 124 may include, but is not limited to, information about the participants, information about the virtual world, and information about computing devices operating the virtual world. Information about the participants may be provided by or retrieved from a database (not shown in FIG. 1) storing personal information about the participant. Information about the virtual world may be provided by or retrieved from virtual world server module 110 and/or the virtual world client module 120. Information about computing devices operating the virtual world may be provided by or retrieved from the computing devices, such as the server computer 102 and the client device 104. It should be appreciated that the evidence 124 is not limited to evidence provided by the participants and the computing devices. For example, the evidence 124 may also include other information such as time of day, network traffic, network usage, and the like. As used herein, the term "evidence provider" refers to a computing device, module, database, or the like that is capable of providing the evidence 124 to evidence collection module 122.

The evidence collection module 122 may obtain the evidence 124 through a push-based process and/or a query-based process. In the push-based process, the information is provided directly to the evidence collection module 122 in an automated process without input from the evidence collection module 122. In the query-based process, the evidence collection module 122 transmits a query and retrieves the information in response to the query. In some embodiments, the push-based process is utilized to obtain general evidence that is applicable for the majority of applications, while the query-based process is utilized to obtain more specific or customized evidence that is not obtained by the push-based process.

The push-based process and the query-based process may be defined by a protocol 128 or a program 130. The protocol 128 and the program 130 may define the operations the virtual world server module 110 and the evidence collection module 122 with respect to the push-based process and the query-based process. In one example, the protocol 128 and the program 130 may define the type of data that is pushed to the evidence collection module 122 through the push-based process. In another example, the protocol 128 and the program 130 may define the type of data that is queried by the evidence collection module 122. The protocol 128 and the program 130 may also define the type of connection between modules, the method of communication between the modules, and the like.

The protocol 128 is generally a pre-defined and standardized collection of rules. In contrast, the program 130 is generally created based on a suitable programming language that enables a user to dynamically define the operations of the evidence providers. The programming language may be a domain-specific language, a conventional programming language, or a XML-based language or configuration. In further embodiments, a workflow-based rule set such as those found in WINDOWS WORKFLOW FOUNDATION or MICROSOFT BIZTALK SERVER both from MICROSOFT CORPORATION may also be similarly utilized.

Figure 2A:
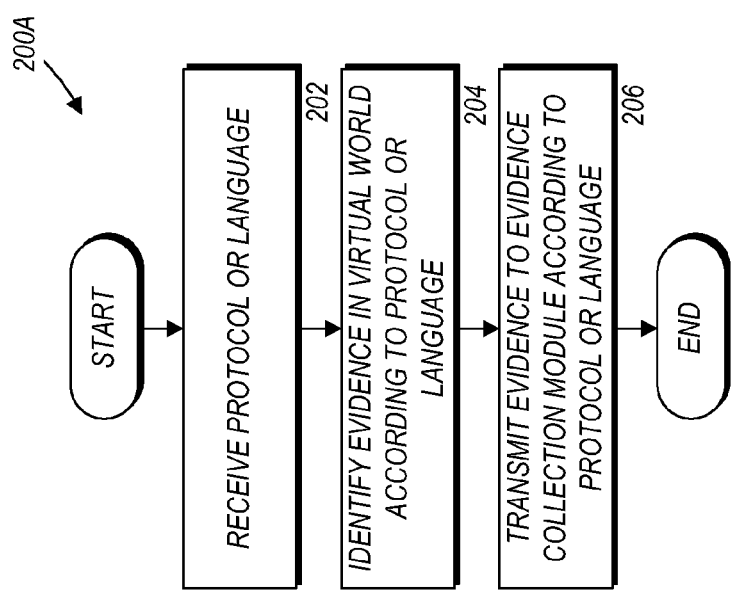
FIG. 2A is a flow diagram illustrating a method for collecting evidence through a push-based process, in accordance with embodiments.
Figure 3:
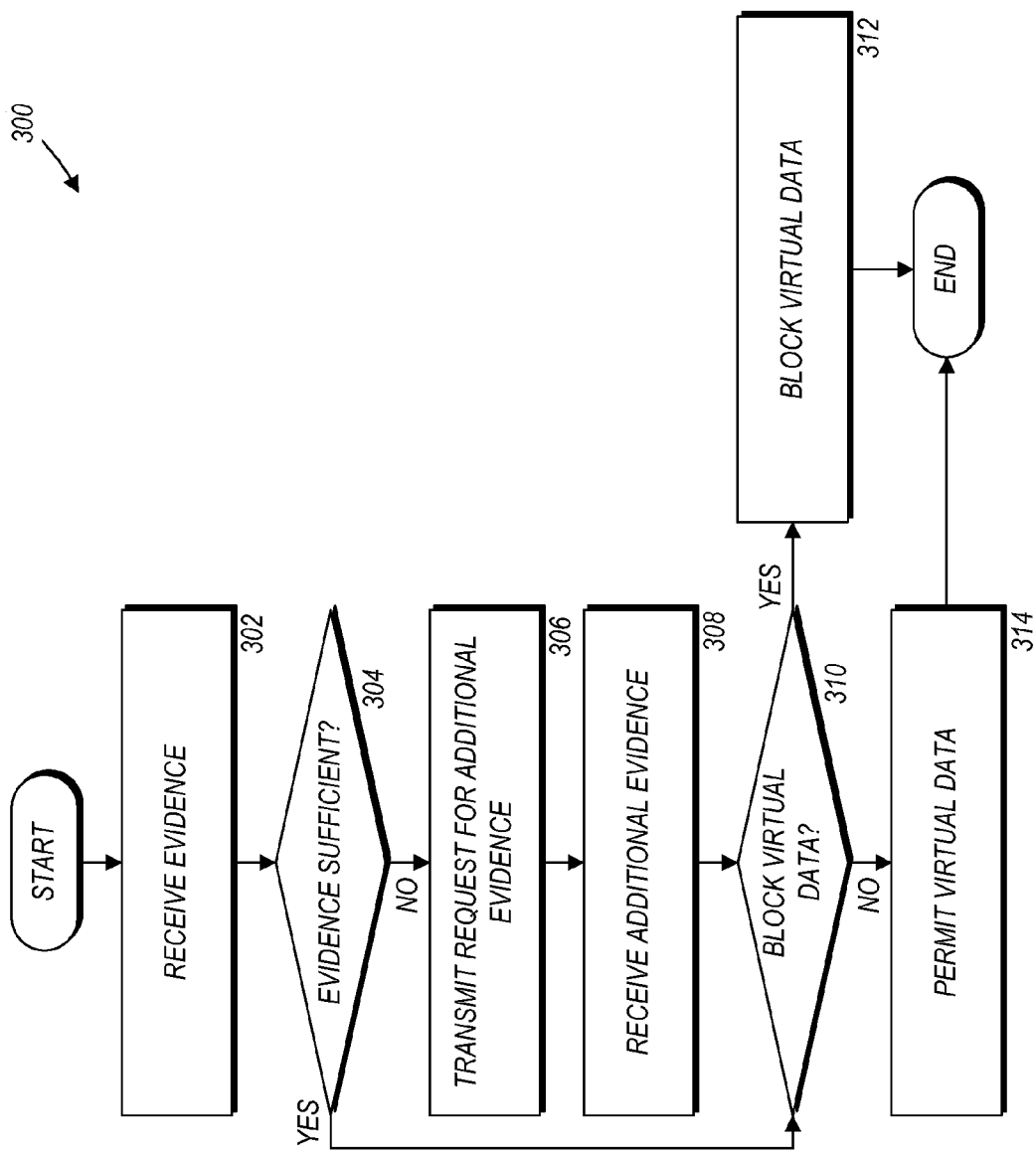
FIG. 3 is a flow diagram illustrating a method for determining whether to permit or block the transmission of virtual world data based on the evidence collected in FIGS. 2A and/or 2B, in accordance with embodiments.

Referring now to FIGS. 2A-2B and 3, additional details will be provided regarding the embodiments presented herein for providing evidence-based virtual world visualization. In particular, FIGS. 2A-2B are flow diagrams illustrating methods for providing evidence, such as the evidence 124, to the evidence collection module 122 in accordance with a push-based process (FIG. 2A) or a query-based process (FIG. 2B). According to embodiments, the methods illustrated in FIGS. 2A-2B may be implemented on various components (referred to herein as "evidence providers") capable of providing the evidence 124 to the evidence collection module 122. Examples of such components may include the virtual world server module 110, the virtual world client module 120, the server computer 102, the client device 104, and the like. FIG. 3 is a flow diagram illustrating a method for permitting or restricting the transmission of virtual world data, such as a virtual world object (hereinafter referred to as a "virtual object"), to the client device 104 based on the evidence 124 collected by the evidence collection module 122. According to embodiments, the method illustrated in FIG. 3 may be implemented on the data protection and abstraction module 126.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

In FIG. 2A, a routine 200A begins at operation 202, where the evidence provider receives a computer protocol, such the protocol 128, or a computer program, such as the program 130. The evidence provider may be the virtual world server module 110, the virtual world client module 120, the server computer 102, the client device 104, or any other component capable of pushing evidence, such as the evidence 124, to the evidence collection module 122, in accordance with the protocol 128 or the program 130.

The protocol 128 and the program 130 may define the operations of each component with respect to the push-based process and the query-based process. In one embodiment, the protocol 128 or the program 130 may be distributed as part of the component. For example, the protocol 128 or the program 130 may be part of the virtual world server module 110 or the virtual world client module 120. In other embodiments, the protocol 128 or the program 130 may be distributed as they are developed and/or updated. Once the evidence provider receives the protocol 128 or the program 130, the routine 200A proceeds to operation 204.

At operation 204, the evidence provider identifies the evidence 124 in accordance with the protocol 128 or the program 130. The protocol 128 or the program 130 may specify a condition or occurrence that triggers the identification of evidence. The protocol 128 or the program 130 may further specify the type of information that is identified as evidence. The evidence 124 may include any data point in the virtual world or the real world that can be utilized as criteria for determining whether to permit or block the transmission of the virtual world data 132 to the client device 104.

In one example, the protocol 128 or the program 130 may specify that when an avatar enters a virtual location, evidence collected may include the relationship status between the participant controlling the avatar and the participant who owns the virtual room. In this example, the virtual world server module 110 or the virtual world client module 120 may push the relationship status to the evidence collection module 122. The relationship status may later be utilized by the data protection and abstraction module 126, as described in greater detail below, to permit or restrict the display virtual world data, such as the virtual world data 132, at the client device 104. For example, certain virtual world data may only be displayed to "friends" of the participant who owns the virtual world.

In another example, the protocol 128 or the program 130 may specify that when an avatar requests certain information, evidence may be collected regarding the security level of the computer or the network 108. The security level may include information about secure connections, secure protocols, encryption, installed patches, version information, and the like. In this example, the server computer 102 or the client device 104 may push the security level to the evidence collection module 122. The security level may later be utilized by the data protection and abstraction module 126, as described in greater detail below, to determine whether to permit or restrict the transmission of the virtual world data 132 to the client device 104. For example, confidential or sensitive virtual world data may only be transmitted to the client device 104 if the client device 104 communicates to the virtual world server module 110 over a secure and encrypted connection.

According to embodiments, the protocol 128 or the program 130 may also specify the type of connection (e.g., wired, wireless, secure, unsecure, etc.) made between the evidence provider and the evidence collection module 122 and the communications protocol (e.g., Transmission Control Protocol/Internet Protocol ("TCP/IP"), User Datagram Protocol ("UDP"), etc.) utilized by the evidence provider to transmit the evidence 124 to the evidence collection module 122. Once the evidence provider identifies the evidence 124 according to the protocol 128 or the program 130, the routine 200A proceeds to operation 206.

At operation 206, the evidence provider transmits the identified evidence 124 to the evidence collection module 122. In the example illustrated in FIG. 2A, the evidence provider transmits the evidence 124 to the evidence collection module 122 through a push-based process. That is, the evidence provider transmits the evidence 124 to the evidence collection module 122 without a query from the evidence collection module 122. The push-based process illustrated in FIG. 2A can be contrasted from the query-based process illustrated in FIG. 2B.

In FIG. 2B, a routine 200B begins at operation 212, where the evidence provider receives the protocol 128 or the program 130. The routine 200B then proceeds to operation 214, where the evidence provider receives a query for the evidence 124 from the evidence collection module 122. In the push-based process described above with respect to FIG. 2A, the protocol 128 or the program 130 specified the type of information that is collected as evidence. In the query-based process illustrated in FIG. 2B, the query may specify the type of information that is collected as evidence. Once the evidence provider receives the query for evidence from the evidence collection module 122, the routine 200B proceeds to operation 216.

At operation 216, the evidence provider determines whether the evidence 124 requested by the query is available. If the evidence provider determines that the evidence 124 requested by the query is available, then the routine 200B proceeds to operation 218. At operation 218, the evidence provider identifies the evidence 124, if the evidence was not previously identified, and transmits the evidence 124 to the evidence collection module 122 according to the protocol 128 or the program 130. If the evidence provider determines that the evidence 124 requested by the query is unavailable, then the routine 200B proceeds to operation 220. At operation 220, the evidence provider transmits an indication that the evidence 124 is unavailable to the evidence collection module 122. For example, the requested evidence 124 may be unavailable if the evidence provider cannot obtain or disclose the evidence 124.

It should be appreciated that the push-based process illustrated in FIG. 2A and the query-based process illustrated in FIG. 2B may be separate processes or combined into a single process. For example, the push-based process may be utilized to obtain generic information, while the query-based process may be utilized to obtain custom information. In this example, the protocol 128 or the program 130 may identify information that is collected as generic evidence in each execution of the protocol 128 or the program 130. In this way, the evidence provider may efficiently push this generic evidence to the evidence collection module 122 without input from the evidence collection module 122. If the evidence collection module 122 later requires additional evidence that is not included in the generic evidence, the evidence collection module 122 may then transmit a query for the additional evidence to the appropriate evidence provider.

In FIG. 3, a routine 300 begins at operation 302, where the data protection and abstraction module 126 receives the evidence 124 from the evidence collection module 122. The evidence collection module 122 may provide the evidence 124 to the data protection and abstraction module 126 at predefined times or intervals. In the alternative, the data protection and abstraction module 126 may request the evidence 124 from the evidence collection module 122 as necessary. In the example illustrated in FIG. 3, the evidence 124 received in operation 302 is generic evidence that the evidence collection module 122 received during the push-based process. Once the data protection and abstraction module 126 receives the generic evidence, the routine 300 proceeds to operation 304.

At operation 304, the data protection and abstraction module 126 determines whether the generic evidence is sufficient to determine whether to permit or block the transmission of the virtual world data 132. If the data protection and abstraction module 126 determines that the generic evidence is sufficient to determine whether to permit or block the transmission of the virtual world data 132, then the routine 300 proceeds to operation 310.

If the data protection and abstraction module 126 determines that the generic evidence is not sufficient to determine whether to permit or block the virtual world data 132, the routine 300 proceeds to operation 306. At operation 306, the data protection and abstraction module 126 transmits a request for additional evidence to the evidence collection module 122. The evidence collection module 122 may then transmit a query for the additional evidence to the appropriate evidence providers, as previously described. The routine 300 then proceeds to operation 308, where the data protection and abstraction module 126 receives the additional evidence. Once the data protection and abstraction module 126 receives the additional evidence, the routine 300 proceeds to operation 310.

At operation 310, the data protection and abstraction module 126 determines, based on the collected evidence (e.g., generic evidence, additional evidence, etc.) 124, whether to permit or block the transmission of the virtual world data 132. The data protection and abstraction module 126 may utilize any suitable criteria and thresholds regarding the collected evidence in order to determine whether to permit or block the transmission of virtual world data 132.

If the data protection and abstraction module 126 determines, based on the collected evidence 124, to block the virtual world data 132, then the routine 300 proceeds to operation 312, where the data protection and abstraction module 126 blocks the virtual world data 132 from being transmitted to the virtual world client module 120 for display through the client device 104. For example, if the virtual world data 132 includes an image of a political poster in a virtual room, then the data protection and abstraction module 126 may block the image of the political poster from being transmitted to the virtual world client module 120. However, the data protection and abstraction module 126 does not affect transmission of the virtual world data regarding the remainder of the virtual room. In this way, the client device 104 still displays virtual room. The participant operating the client device 104 may or may not have any knowledge that the image of the political poster is missing.

If the data protection and abstraction module 126 determines, based on the collected evidence 124, to permit the transmission of the virtual world data 132, then the routine 300 proceeds to operation 314, where the data protection and abstraction module 126 permits the transmission of the virtual world data 132 from the virtual world server module 110 to the virtual world client module 120. In particular, the data protection and abstraction module 126 may determine whether the evidence 124 satisfies a condition for blocking transmission of the virtual world data 132 or for permitting transmission of the virtual world data 132. For example, if the virtual world data comprises an image of a political poster in a virtual room, then the data protection and abstraction module 126 does not block the virtual world server module 110 from transmitting the image of the political poster to the virtual world client module 120. Thus, the client device 104 may display the virtual room including the image of the political poster.

According to embodiments, the data protection and abstraction module 126 may operate in one of two states. In one state, the data protection and abstraction module 126 permits the transmission of the virtual world data 132 to the virtual world client module 120. In the other state, the data protection and abstraction module 126 blocks the transmission of the virtual world data 132 to the virtual world client module 120. The method described above with reference to FIG. 3 may be utilized to determine the state to which the data protection and abstraction module 126 is transformed based on the evidence 124.

Figure 4:
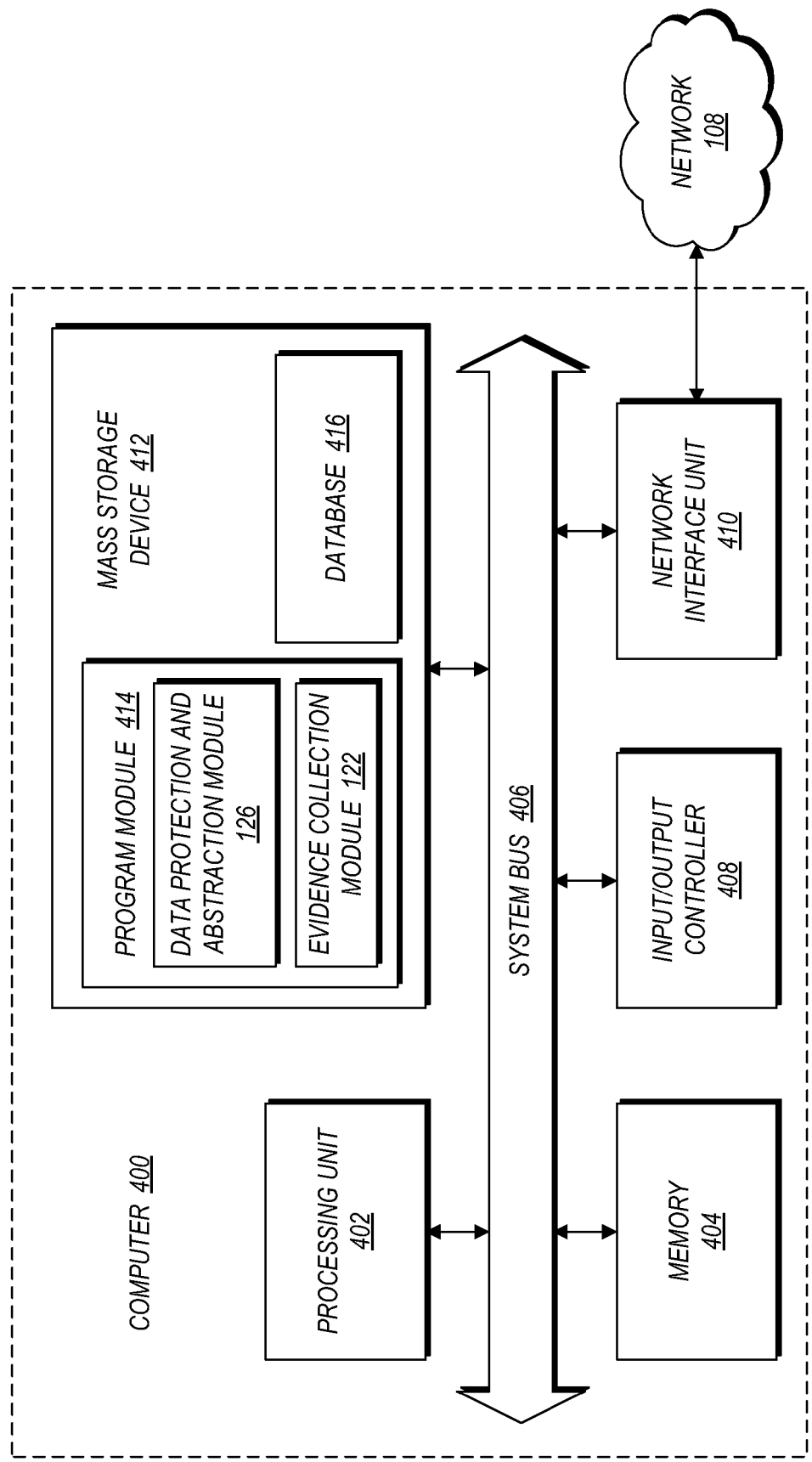
FIG. 4 is a computer architecture diagram showing aspects of an illustrative computer hardware architecture for a computing system capable of implementing aspects of the embodiments presented herein.

Referring now to FIG. 4, an exemplary computer architecture diagram showing aspects of a computer 400 is illustrated. Examples of the computer 400 may include the server computer 102 and the client device 104. The computer 400 includes a processing unit 402 ("CPU"), a system memory 404, and a system bus 406 that couples the memory 404 to the CPU 402. The computer 400 further includes a mass storage device 412 for storing one or more program modules 414 and one or more databases 416. Examples of the program modules 414 include the evidence collection module 122 and the data protection and abstraction module 126. The mass storage device 412 is connected to the CPU 402 through a mass storage controller (not shown) connected to the bus 406. The mass storage device 412 and its associated computer-storage media provide non-volatile storage for the computer 400. Although the description of computer-storage media contained herein refers to a mass storage device, such as a hard disk or CD-ROM drive, it should be appreciated by those skilled in the art that computer-storage media can be any available computer storage media that can be accessed by the computer 400.

By way of example, and not limitation, computer-storage media may include volatile and non-volatile, removable and non-removable media implemented in any method or technology for storage of information such as computer-storage instructions, data structures, program modules, or other data. For example, computer-storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 400.

According to various embodiments, the computer 400 may operate in a networked environment using logical connections to remote computers through a network such as the network 108. The computer 400 may connect to the network 108 through a network interface unit 410 connected to the bus 406. It should be appreciated that the network interface unit 410 may also be utilized to connect to other types of networks and remote computer systems. The computer 400 may also include an input/output controller 408 for receiving and processing input from a number of input devices (not shown), including a keyboard, a mouse, a microphone, and a game controller. Similarly, the input/output controller 408 may provide output to a display or other type of output device (not shown).

The bus 406 may enable the processing unit 402 to read code and/or data to/from the mass storage device 412 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state, or may include rotating media storing magnetically-encoded information.

The program modules 414 may include software instructions that, when loaded into the processing unit 402 and executed, cause the computer 400 to facilitate non-linguistic interaction with users via surface stimulation. The program modules 414 may also provide various tools or techniques by which the computer 400 may participate within the overall systems or operating environments using the components, flows, and data structures discussed throughout this description. For example, the program modules 414 may implement interfaces that facilitate non-linguistic interaction between the computer 400 and any number of users.

In general, the program modules 414 may, when loaded into the processors 106 and executed, transform the processing unit 402 and the overall computer 400 from a general-purpose computing system into a special-purpose computing system customized to facilitate non-linguistic interaction with computer systems via surface stimulation. The processing unit 402 may be constructed from any number of transistors or other discrete circuit elements, which may individually or collectively assume any number of states. More specifically, the processing unit 402 may operate as a finite-state machine, in response to executable instructions contained within the program modules 414. These computer-executable instructions may transform the processing unit 402 by specifying how the processing unit 402 transitions between states, thereby transforming the transistors or other discrete hardware elements constituting the processing unit 402.

Encoding the program modules 414 may also transform the physical structure of the computer-storage media. The specific transformation of physical structure may depend on various factors, in different implementations of this description. Examples of such factors may include, but are not limited to: the technology used to implement the computer-storage media, whether the computer-storage media are characterized as primary or secondary storage, and the like. For example, if the computer-storage media are implemented as semiconductor-based memory, the program modules 414 may transform the physical state of the semiconductor memory, when the software is encoded therein. For example, the program modules 414 may transform the state of transistors, capacitors, or other discrete circuit elements constituting the semiconductor memory.

As another example, the computer-storage media may be implemented using magnetic or optical technology. In such implementations, the program modules 414 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that technologies for providing evidence-based virtual world visualization are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing evidence-based virtual world visualization, the computer-implemented method comprising computer-implemented operations for:
   receiving evidence;
   determining whether the evidence is sufficient to determine whether to block transmission of virtual world data regarding a virtual object to a client device, the virtual object being in a virtual location;
   in response to determining that the evidence is sufficient to determine whether to block transmission of the virtual world data to the client device, determining whether to block transmission of the virtual world data to the client device based on the evidence;
   in response to determining to block transmission of the virtual world data to the client device based on the evidence, transforming a data protection and abstraction module to a first state that blocks the transmission of the virtual world data to the client device; and
   wherein the first state blocks transmission of the virtual world data regarding the virtual object in the virtual location to the client device while permitting transmission of virtual world data regarding the virtual object in the virtual location to another client device and permitting transmission of virtual world data regarding another virtual object in the virtual location to the client device.

2. The computer-implemented method of claim 1, further comprising computer-implemented operations for:
   in response to determining to permit transmission of virtual world data to the client device based on the evidence, transforming the data protection and abstraction module to a second state that permits transmission of the virtual world data to the client device.

3. The computer-implemented method of claim 1, further comprising computer-implemented operations for:
   in response to determining that the evidence is not sufficient to determine whether to block transmission of the virtual world data to the client device,
   transmitting a request for additional evidence, and
   upon transmitting the request for additional evidence, receiving the additional evidence.

4. The computer-implemented method of claim 3, wherein determining whether to block transmission of the virtual world data to the client device based on the evidence comprises determining whether to block transmission of the virtual world data to the client device based on the evidence and the additional evidence.

5. The computer-implemented method of claim 1, wherein receiving evidence comprises receiving the evidence from an evidence collection module through a push-based process.

6. The computer-implemented method of claim 1, wherein receiving evidence comprises receiving the evidence from an evidence collection module through a query-based process.

7. The computer-implemented method of claim 1, wherein the evidence comprises information regarding a virtual world, and wherein the determination whether to block transmission of the virtual world data is based at least in part on attributes comprising a picture or message associated with the virtual object in the virtual world.

8. The computer-implemented method of claim 1, wherein determining whether to block transmission of the virtual world data to the client device based on the evidence comprises determining whether the evidence satisfies a condition for blocking transmission of the virtual world data to the client device or for permitting transmission of the virtual world data to the client device.

9. The computer-implemented method of claim 1, wherein the virtual object is in a virtual room in a virtual world, and wherein the determination whether to block transmission of the virtual world data is based at least in part on attributes of the virtual object.

10. A computer system, comprising:
    a processor;
    a memory operatively coupled to the processor;

an evidence collection module which executes in the processor from the memory and which, when executed by the processor, causes the computer system to obtain evidence by
  collecting evidence through a push-based process,
  providing the evidence to a server module,
  receiving a request for additional evidence from the server module,
  in response to receiving the request to collect additional evidence, collecting the additional evidence through a query-based process, and
  upon collecting the additional evidence, providing the additional evidence to the server module; and
the server module which executes in the processor from the memory and which, when executed by the processor, causes the computer system to provide evidence-based virtual world visualization by
  receiving the evidence from the evidence collection module,
  determining whether the evidence is sufficient to determine whether to block transmission of virtual world data regarding a virtual object to a client device over a network,
  in response to determining that the evidence is not sufficient to determine whether to block transmission of the virtual world data to the client device, requesting additional evidence from the evidence collection module;
  in response to determining that the evidence including any additional evidence is sufficient to determine whether to block transmission of the virtual world data to the client device, determining whether to block transmission of the virtual world data to the client device over the network based on the evidence and any additional evidence,
  in response to determining to block transmission of the virtual world data to the client device based on the evidence and any additional evidence, transforming a data protection and abstraction module to a first state that blocks transmission of the virtual world data to the client device over the network, and
  in response to determining not to block transmission of virtual world data to the client device based on the evidence and any additional evidence, transforming the data protection and abstraction module to a second state that permits transmission of the virtual world data to the client device over the network.

11. The computer system of claim 10, wherein the server module, when executed by the processor, further causes the computer system to provide evidence-based virtual world visualization by
  in response to determining that the evidence is not sufficient to determine whether to block transmission of the virtual world data to the client device,
    transmitting the request for additional evidence to the evidence collection module, and
    upon transmitting the request for additional evidence to the evidence collection module, receiving the additional evidence from the evidence collection module.

12. The computer system of claim 10, wherein collecting evidence through the push-based process comprises receiving, from an evidence provider, the evidence through an automated process specified by a computer protocol executed by the evidence provider.

13. The computer system of claim 10, wherein collecting additional evidence through a query-based process comprises:
  transmitting a query for the additional evidence to an evidence provider; and
  upon transmitting the query for the additional evidence to the evidence provider, receiving the additional evidence from the evidence provider.

14. A computer-storage medium comprising an optical disk, a magnetic storage device, or a solid state storage device, the computer-storage medium having computer-executable instructions stored thereon which, when executed by a computer, cause the computer to:
  receive evidence from an evidence collection module, the evidence comprising information regarding a virtual world and information regarding a real world;
  determine whether the evidence is sufficient to determine whether to block transmission of a virtual object to a client computer over a network, the client computer operative to render the virtual object for display;
  in response to determining that the evidence is not sufficient to determine whether to block transmission of the virtual object to the client computer,
    transmit a request to the evidence collection module for additional evidence, and
    upon transmitting the request to the evidence collection module for the additional evidence, receive the additional evidence from the evidence collection module;
  in response to determining that the evidence is sufficient to determine whether to block transmission of the virtual object to the client computer, determine whether to block transmission of the virtual object to the client computer over the network based on the received evidence; and
  in response to determining to block transmission of the virtual object to the client computer based on the received evidence, transform a data protection and abstraction module to a first state that blocks transmission of the virtual object to the client computer over the network; and
  in response to determining to permit transmission of the virtual object to the client computer based on the evidence, transform the data protection and abstraction module to a second state that permits transmission of the virtual object to the client computer over the network.

15. The computer-storage medium of claim 14, wherein the evidence collection module collects the evidence through a push-based process and collects the additional evidence through a query-based process.

16. The computer-storage medium of claim 14, wherein the evidence is specified by a computer protocol or a computer program, and wherein the additional evidence is specified by a query.

17. The computer system of claim 10, wherein the virtual object is in a virtual location and wherein the server module, in response to determining to block transmission of the virtual world data to the client device based on the evidence, blocks transmission of the virtual world data regarding the virtual object in the virtual location to the client device while permitting transmission of virtual world data regarding the virtual object in the virtual location to another client device and permitting transmission of virtual world data regarding another virtual object in the virtual location to the client device.

18. The computer-storage medium of claim 14, wherein the virtual object is in a virtual location and wherein the first state blocks transmission of the virtual world data regarding the virtual object in the virtual location to the client device while permitting transmission virtual world data regarding the virtual object in the virtual location to another client device and permitting transmission of virtual world data regarding another virtual object in the virtual location to the client device.

* * * * *